US012705024B1

(12) United States Patent
Bordow et al.

(10) Patent No.: US 12,705,024 B1
(45) Date of Patent: Aug. 11, 2026

(54) APPARATUSES AND METHODS FOR IDENTITY BASED PSEUDO-RANDOM NUMBER GENERATION

(71) Applicant: Wells Fargo Bank, N.A., San Francisco, CA (US)

(72) Inventors: Peter Bordow, Fountain Hills, AZ (US); Jeff J. Stapleton, O'Fallon, MO (US); Ramesh Yarlagadda, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 618 days.

(21) Appl. No.: 17/384,094

(22) Filed: Jul. 23, 2021

(51) Int. Cl.
*G06F 7/58* (2006.01)
*G06F 16/245* (2019.01)
*G06F 21/31* (2013.01)

(52) U.S. Cl.
CPC ............ *G06F 7/582* (2013.01); *G06F 16/245* (2019.01); *G06F 21/31* (2013.01)

(58) Field of Classification Search
CPC . G06F 7/58; G06F 7/582; G06F 7/584; G06F 7/586; G06F 21/46
See application file for complete search history.

(56) References Cited

U.S. PATENT DOCUMENTS 6,189,036 B1 * 2/2001 Kao ........................ G06F 9/468 709/225
6,307,938 B1 * 10/2001 Matyas, Jr. ........... H04L 9/3033 380/46
7,178,025 B2 2/2007 Scheidt et al.
7,233,686 B2 6/2007 Hamid
7,415,614 B2 8/2008 Guillou
8,085,938 B2 12/2011 Kagaya et al.
9,450,954 B2 9/2016 Sharif et al.
9,474,934 B1 10/2016 Krueger et al.
9,477,832 B2 10/2016 Cross et al.
9,992,022 B1 6/2018 Chapman et al.
10,453,159 B2 10/2019 Kapczynski
10,853,592 B2 12/2020 Rodriguez et al.
(Continued)

OTHER PUBLICATIONS

Jan Camenisch and Thomas Groß. 2008. Efficient attributes for anonymous credentials. In Proceedings of the 15th ACM conference on Computer and communications security (CCS '08). Association for Computing Machinery, New York, NY, USA, 345-356. https://doi.org/10.1145/1455770.1455814 (Year: 2008).*

*Primary Examiner* — James Trujillo
*Assistant Examiner* — Markus Anthony Villanueva
(74) *Attorney, Agent, or Firm* — K&L Gates LLP

(57) ABSTRACT

A computer-implemented method, apparatus, and computer program product for identity based pseudo-random number generation are provided. An example method includes receiving a request for a pseudo-random number selecting a first attribute associated with a first user where the first attribute is associated with a first attribute category that is assigned a first prime number and obtaining a first value for the first attribute. The method further includes selecting a second attribute associated with the first user where the second attribute is associated with a second attribute category that is assigned a second prime number and obtaining a second value for the second attribute. The method includes generating a pseudo-random number based upon the first value and the second value.

20 Claims, 5 Drawing Sheets

(56) References Cited

U.S. PATENT DOCUMENTS

| | | | | |
|---|---|---|---|---|
| 11,048,794 | B1 | 6/2021 | Bordow | |
| 12,003,628 | B2 * | 6/2024 | Vakili | H04L 65/1079 |
| 12,476,966 | B2 * | 11/2025 | Buscemi | H04L 63/0861 |
| 12,489,623 | B2 * | 12/2025 | Shorten | H04L 9/0662 |
| 12,511,406 | B2 * | 12/2025 | Luo | G06F 21/602 |
| 2002/0071563 | A1 * | 6/2002 | Kurn | H04L 9/16 380/280 |
| 2005/0144484 | A1 | 6/2005 | Wakayama | |
| 2006/0036857 | A1 * | 2/2006 | Hwang | G06F 21/31 713/168 |
| 2007/0009140 | A1 | 1/2007 | Jitsui et al. | |
| 2007/0016940 | A1 * | 1/2007 | Yearty | G06F 21/34 726/5 |
| 2008/0162484 | A1 * | 7/2008 | Yoshida | G06F 21/6218 707/999.009 |
| 2009/0164799 | A1 * | 6/2009 | Takagi | H04L 9/3231 713/186 |
| 2010/0115281 | A1 * | 5/2010 | Camenisch | H04L 9/302 713/168 |
| 2013/0333051 | A1 * | 12/2013 | Takenouchi | H04L 9/0662 726/26 |
| 2014/0059100 | A1 * | 2/2014 | Liberty | G06F 7/58 708/250 |
| 2016/0191515 | A1 * | 6/2016 | Kim | G06F 21/32 726/6 |
| 2017/0346851 | A1 | 11/2017 | Drake | |
| 2018/0254904 | A1 * | 9/2018 | Hwang | H04L 9/0869 |
| 2019/0294417 | A1 * | 9/2019 | Wu | G06F 7/72 |
| 2020/0328886 | A1 * | 10/2020 | Newton | H04L 9/0819 |
| 2020/0382295 | A1 * | 12/2020 | Howells | H04L 9/3066 |
| 2021/0035203 | A1 | 2/2021 | Daigle et al. | |
| 2024/0313971 | A1 * | 9/2024 | Wagner | H04L 9/0869 |

* cited by examiner

100

200
Memory
204
Processor
202
Input/Output Circuitry
206
Communications Circuitry
208
Generation Circuitry
210

500

APPARATUSES AND METHODS FOR IDENTITY BASED PSEUDO-RANDOM NUMBER GENERATION

TECHNOLOGICAL FIELD

Example embodiments of the present disclosure relate generally to pseudo-random number generation and, more particularly, to the use of digital identity to improve pseudo-random number generation and associated authentication.

BACKGROUND

Pseudo-random number generation is used in a variety of applications from economic simulations to cryptography. For example, pseudo-random numbers may be used to authenticate a session, generate a password, or otherwise validate interactions between users or devices by serving as a unique identifier. As such, pseudo-random number generation techniques may be employed by a variety of industries to establish connections with user as well as to authenticate these users.

BRIEF SUMMARY

As described above, pseudo-random numbers may be used in a variety of applications and industries to authenticate a session, generate a password, or otherwise validate interactions between users or devices by serving as a unique identifier. Traditional methods for generating a pseudo-random number, however, have become increasingly susceptible to attack as the availability of computing power has increased. In this way, a user's session, password, etc. may be compromised simply by virtue of the new technical problems emergent in response to the growing computing resources available today, because perpetrators have a greater ability to determine the method by which the session identifier is pseudo-randomly generated, replicate the method to generate the same session identifier, and break into the user's session. Furthermore, conventional systems and methods for authenticating a user rely upon stagnant user credentials (e.g., a user inputted password or the like) that may be similarly suspectable to attack and/or require constant vigilance on the part of the user. For example, a user may be traditionally required to not only remember a unique password for use with each entity with which the user interacts but may also be required to diligently protect these passwords.

To solve these issues and others, example implementations of embodiments of the present disclosure may provide identity based pseudo-random number generation that leverages user attributes. Embodiments of the present disclosure may select (e.g., randomly or otherwise) user attributes that are associated with attribute categories that are also assigned a prime number. Various operations described herein may be used to obtain a value for the respective attribute and, in combination with the assigned prime number, may generate a pseudo-random number based upon the obtained values. Such a generated pseudo-random number may, in some embodiments, be used to generate authentication credentials (e.g., a password or the like) for the associated user and/or serve as the basis for a session identifier. Furthermore, embodiments described herein may leverage a digital identity construct database that operates as an evolving collection of user attributes so as to provide dynamic credential and session identifier generation. In this way, the inventors have identified that the advent of computing resources have created a new opportunity for solutions to pseudo-random number generation and authentication which were historically unavailable.

Systems, apparatuses, methods, and computer program products are disclosed herein for identity based pseudo-random number generation. In one embodiment, with reference to the claimed method, a method for identity based pseudo-random number generation is provided. The method may include receiving a request for a pseudo-random number, selecting a first attribute associated with a first user, wherein the first attribute is associated with a first attribute category that is assigned a first prime number, and obtaining a first value for the first attribute. The method may further include selecting a second attribute associated with the first user, wherein the second attribute is associated with a second attribute category that is assigned a second prime number and obtaining a second value for the second attribute. The method may further include generating a pseudo-random number based upon the first value and the second value.

In some embodiments, the method may further include generating authentication credentials for the first user based upon the pseudo-random number and associating the authentication credentials with the request for the pseudo-random number.

In some embodiments, the method may further include querying a digital identity construct database storing one or more previously acquired attributes of the first user and authenticating the first user based upon a comparison between the generated pseudo-random number and the one or more previously acquired attributes of the first user. In such an embodiment the method may further include modifying the one or more previously acquired attributes of the first user stored by the digital identity construct based upon one of the selected first attribute or the selected second attribute.

In some embodiments, the method may further include receiving an instruction to generate a session identifier from a first user device associated with the first user and determining that the request for the session identifier requires the pseudo-random number. In such an embodiment, the method may further include generating the session identifier based upon the pseudo-random number and transmitting the session identifier to the first user device.

In some embodiments, selecting one of the first attribute or the second attribute further includes querying a digital identity construct database storing one or more previously acquired attributes of the first user. In such an embodiment, selection of one of the first attribute or the second attribute may include implementing a pseudo-random selection protocol that identifies a first particular attribute or a second particular attribute, respectively, from the digital identity construct database.

In some embodiments, selecting one of the first attribute or the second attribute may include receiving a user input by the first user corresponding to either the first attribute or the second attribute, respectively.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
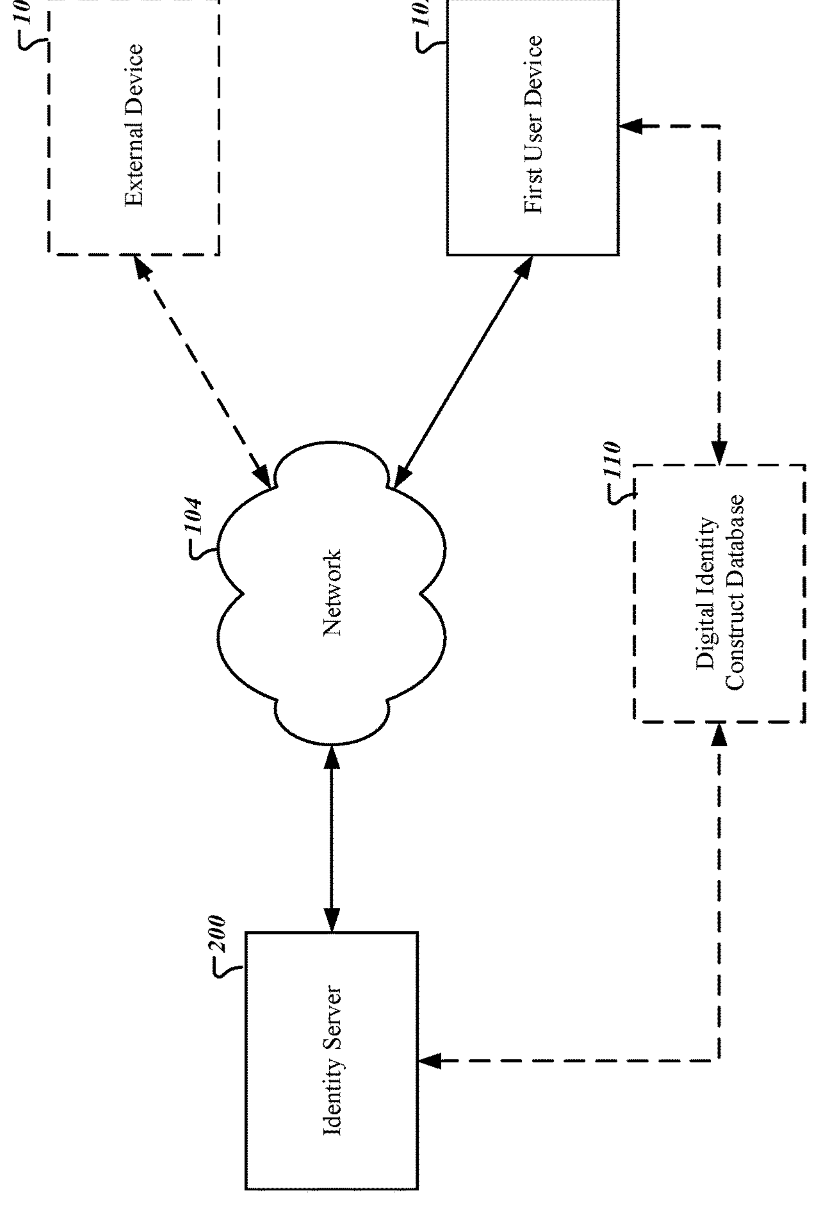
FIG. 1 illustrates a system diagram including devices that may be involved in some example embodiments described herein.

Some embodiments of the present disclosure will now be described more fully hereinafter with reference to the accompanying drawings, in which some, but not all embodiments of the disclosure are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout. As used herein, the description may refer to an identity server as an example "apparatus." However, elements of the apparatus described herein may be equally applicable to the claimed method and computer program product. Thus, use of any such terms should not be taken to limit the spirit and scope of embodiments of the present disclosure.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "user device," "first user device," "mobile device," "electronic device" and the like refer to computer hardware that is configured (either physically or by the execution of software) to access one or more services made available by the identity server (e.g., apparatus or computing device of the present disclosure) and, among various other functions, is configured to directly, or indirectly, transmit and receive data. Example user devices may include a smartphone, a tablet computer, a laptop computer, a wearable device (e.g., smart glasses, smart watch, or the like), and the like. In some embodiments, a user device may include a "smart device" that is equipped with chip of other electronic device that is configured to communicate with the external device via Bluetooth, NFC, Wi-Fi, 3G, 4G, 5G, RFID protocols, and the like. By way of a particular example, a user device may be a mobile phone equipped with a Wi-Fi radio that is configured to communicate with a Wi-Fi access point that is in communication with the identity server 200 or other computing device via a network.

As used herein, the term "external device" refers to any object, device, or system which may be in network communication with the first user device or identity server. For example, an external device may be an external server or computing device (e.g., associated with a corporation, banking entity, or other 3rd party) that may request, receive, and/or provide data to or from one of the devices described above. By way of a more particular example, an external device may include a server of a bank, online vendor, or the like configured to be located in secure communication with the first user device via an authenticated session (e.g., via the pseudo-random number techniques described herein).

As used herein, the terms "digital identity construct" and "digital identity construct database" refer to a data structure or repository for storing user attributes. The digital identity construct database may, for example, include a plurality of static attributes and dynamic attributes. As such, "static" attributes may refer to data entries associated with user attributes that may remain constant over time. By way of example, a static attribute may include dates, locations, addresses, and/or the like indicative of events (e.g., birthdays, first car purchase, most recent mailing addresses, or the like) that do not change. Alternatively, "dynamic" attributes may refer to data entries associated with user attributes that may vary over time. By way of example, a dynamic data attribute may include biometric features (e.g., age, weight, height, hair color, etc.), current location data, and/or the like that are capable of changing as, for example, a user ages, moves, etc. The present disclosure contemplates that the digital identity construct may include any number of user attributes associated with any number of respective users and may operate to, in some embodiments, store substantially all identifying data attributes, events, or the like associated with a particular user. Said differently, the present disclosure contemplates that the digital identity construct database may store any feature, data entry, element, data object, etc. associated with a user without limitation so as to form a substantially complete digital representation of the user's identity. For example, the digital identity construct and digital identity database may encompass, include, or otherwise access an identity system or identity databank, such as those described in U.S. patent application Ser. No. 16/268,288.

The digital identity construct database may be, for example, initially populated or otherwise supplied with user data as part of an initial set up procedure. For example, a first user may supply information (e.g., static or dynamic) about the user as part of an account set up procedure. Additionally or alternatively, the digital identity construct may be populated, updated, modified, or the like over time to provide an evolving repository of user attributes. For example, one or more static user attributes may be added to the digital identity construct database over time (e.g., new biometric data entries, new locations, new addresses, new financial transactions, etc.) and one or more dynamic user attributes may be updated or modified over time (e.g., current location, current job, new height, new weight, new hair color, etc.). In some instances, user attributes may be added or updated in the digital identity construct database in response to actions on the part of the user, such as input by the user in response to a request. In other embodiments, attributes may be added or updated in the digital identity construct automatically or otherwise without affirmative action on the part of the associated user. By way of example, a user may interact with an automated teller machine (ATM) and may input user attributes associated with the user (e.g., a request for an updated address, phone number, etc.). The ATM may include, for example, one or more sensors (e.g., cameras, scanners, scales, microphones, or the like) configured to determine user attributes (e.g., hair color, weight, etc.) and may update the digital identity construct accordingly. The present disclosure contemplates that any mechanism for supplying user attributes to the digital identity construct (e.g., social media scraping, location data monitoring, transaction history analysis, data processing, etc.) may be used without limitation.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, an example system 100 is illustrated with an apparatus (e.g., an identity server 200) communicably connected via a network 104 to a first user device 102 and, in some embodiments, an external device 106. The example system 100 may also include an digital identity construct database 110 that may be hosted by the identity server 200 or otherwise hosted by devices in communication with the identity server 200.

The identity server 200 may include circuitry, networked processors, or the like configured to perform some or all of the apparatus-based (e.g., identity server-based) processes described herein, and may be any suitable network server and/or other type of processing device. In this regard, identity server 200 may be embodied by any of a variety of devices. For example, the identity server 200 may be configured to receive input data (e.g., user attribute data) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs, but will nevertheless include at least the components illustrated in FIG. 2 and described in connection therewith. In some embodiments, the identity server 200 may be located remotely from the first user device 102, external device 106, and/or digital identity construct database 110, although in other embodiments, the identity server 200 may comprise the first user device 102, external device 106, and/or digital identity construct database 110. The identity server 200 may, in some embodiments, comprise several servers or computing devices performing interconnected and/or distributed functions. Despite the many arrangements contemplated herein, the identity server 200 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The first user device 102 may be associated with a first user and may be configured to generate and/or access user attribute data associated with the first user. Although a single user device associated with a corresponding user is shown, the example system 100 may include any number of user devices that may be associated with various users. The first user device 102 may be a cellular telephone (e.g., a smartphone and/or other type of mobile telephone), laptop, tablet, electronic reader, e-book device, media device, wearable, smart glasses, smartwatch, ATM, mobile device, any combination of the above, or any device by which the first user may access the identity server 200, the digital identity construct database 110, or the like. In some embodiments, the first user device 102 may be configured to request a pseudo-random number (e.g., from the identity server 200). The first user device 102 may also allow a user to provide input (e.g., by way of a biometric scan, actionable notification, or the like) which may be conveyed to the identity server 200 via the network 104 as attribute data. Attribute data may be generated via one or more input devices including, without limitation, a touchscreen, microphone, camera, optical scanner, fingerprint reader, and/or motion sensor device (e.g., an accelerometer, gyroscope, etc.).

The external device 106, as defined above, may be associated with any entity that is not associated with the first user device 102. By way of a more particular example, the external device 106 may include a server of a bank, online vendor, or other $3^{rd}$-party configured to be in secure communication with the first user device 102 via the network 104 (e.g., an authenticated session). Although shown as a single external device 106, the system 100 may include any number of external devices. In some embodiments, the external device 106 may be configured to request a pseudo-random number (e.g., from the identity server 200), such as to establish a secure session with the first user device 102. The external device 106 may also allow a user to provide input (e.g., by way of a biometric scan, actionable notification, or the like) which may be conveyed to the identity server 200 via the network 104 as attribute data. Attribute data may be generated via one or more input devices including, without limitation, a touchscreen, microphone, camera, optical scanner, fingerprint reader, and/or motion sensor device (e.g., an accelerometer, gyroscope, etc.).

The digital identity construct database 110 may be stored by any suitable storage device configured to store some or all of the information described herein (e.g., memory 204 of the identity server 200 or a separate memory system separate from the identity server 200, such as one or more database systems, backend data servers, network databases, cloud storage devices, or the like provided by an external device 106 (e.g., a banking entity or $3^{rd}$ party provider) or the first user device 102). The digital identity construct database 110 may comprise data received from the identity server 200 (e.g., via a memory 204 and/or processor(s) 202) or the first user device 102, and the corresponding storage device may thus store this data. To avoid unnecessarily overcomplicating the disclosure, the digital identity construct database 110 is shown and described as a separate database, despite the fact that they may each be hosted by any number of specific physical devices, together or separately.

Figure 2:
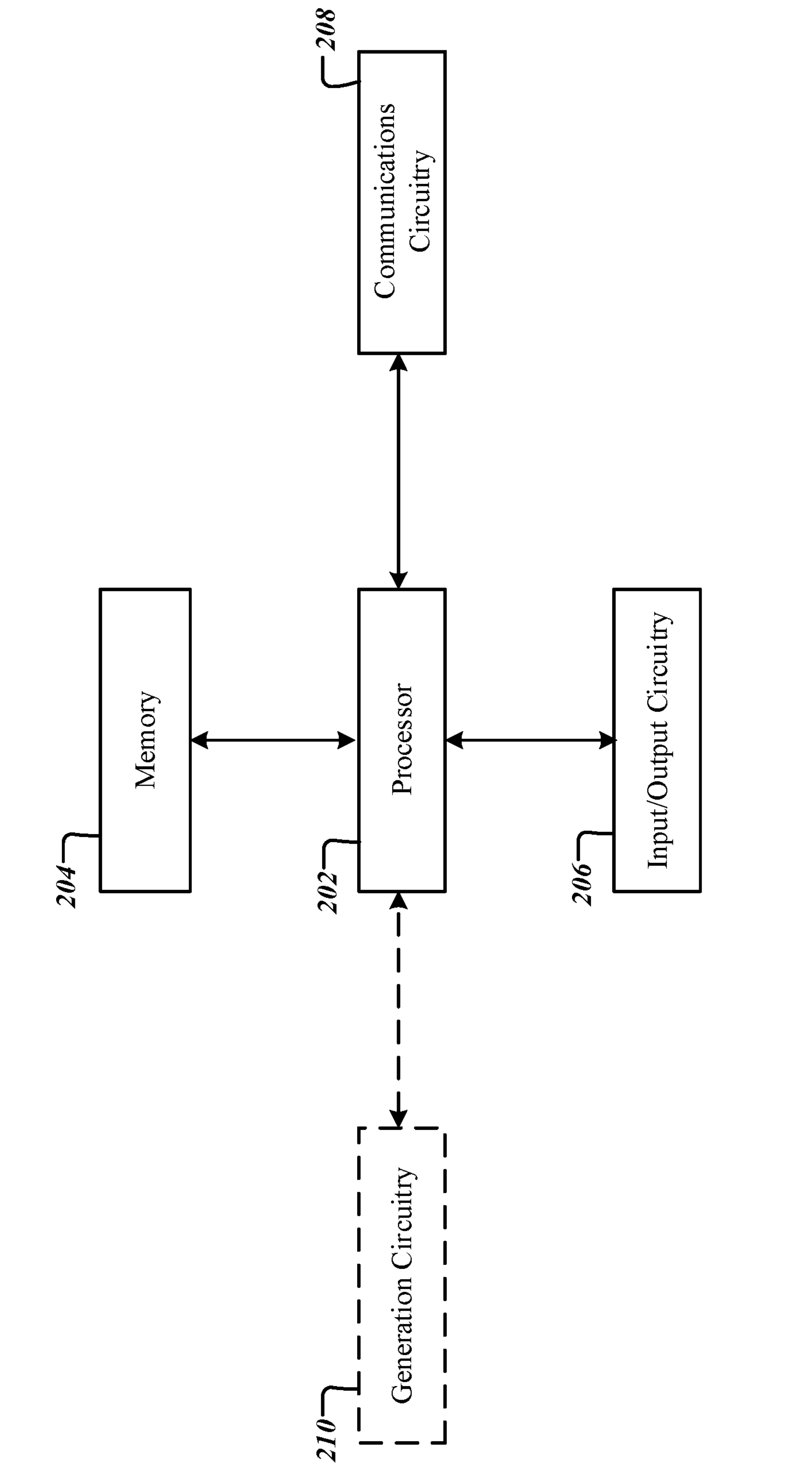
FIG. 2 illustrates a schematic block diagram of example circuitry that may perform various operations, in accordance with some example embodiments described herein.

As illustrated in FIG. 2, the identity server 200 may include a processor 202, a memory 204, input/output circuitry 206, and communications circuitry 208. Moreover, identity server 200 may include generation circuitry 210. The identity server 200 may be configured to execute the operations described below in connection with FIGS. 3-5. Although components 202-210 are described in some cases using functional language, it should be understood that the particular implementations necessarily include the use of particular hardware. It should also be understood that certain of these components 202-210 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the identity server 200 may be housed within one or more of the first user device 102 or the external device 106. As indicated previously, it will be understood in this regard that some of the components described in connection with the identity server 200 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the identity server 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the identity server 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the identity server to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the identity server, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The identity server 200 further includes input/output circuitry 206 that may, in turn, be in communication with processor 202 to provide output to a user and to receive input from a user, user device, or another source (e.g., so as receive user attribute data). In this regard, the input/output circuitry 206 may comprise a display that may be manipulated by a mobile application. In some embodiments, the input/output circuitry 206 may also include additional functionality such as a keyboard, a mouse, a joystick, a touch screen, touch areas, soft keys, a microphone, a speaker, or other input/output mechanisms. The processor 202 may be configured to control one or more functions of a display through computer program instructions (e.g., software and/or firmware) stored on a memory accessible to the processor (e.g., memory 204, and/or the like), so as receive user attribute data.

The communications circuitry 208 may be any means such as a device or circuitry embodied in either hardware or a combination of hardware and software that is configured to receive and/or transmit data from/to a network and/or any other device, circuitry, or module in communication with the identity server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the identity server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Generation circuitry 210 includes hardware components designed to obtain a first value for the selected first attribute and to obtain a second value for the second selected attribute. The generation circuitry 210 may further include hardware components designed to generate a pseudo-random number based upon the first value and the second value, in conjunction with the prime numbers assigned to the respective attribute categories. These hardware components may, for instance, utilize elements of processor 202 or memory 204 to pseudo-randomly select attributes of a user from a digital identity construct database as defined above. Generation circuitry 210 may utilize processing circuitry, such as the processor 202, to perform its corresponding operations, and may utilize memory 204 to store collected information. It should also be appreciated that, in some embodiments, the generation circuitry 210 may include a separate processor, specially configured field programmable gate array (FPGA), or application specific interface circuit (ASIC) to perform its corresponding functions.

In addition, computer program instructions and/or other type of code may be loaded onto a computer, processor or other programmable identity server's circuitry to produce a machine, such that the computer, processor other programmable circuitry that execute the code on the machine create the means for implementing the various functions, including those described in connection with the components of identity server 200.

As described above and as will be appreciated based on this disclosure, embodiments of the present disclosure may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Identity Based Pseudo-Random Number Generation

Figure 3:
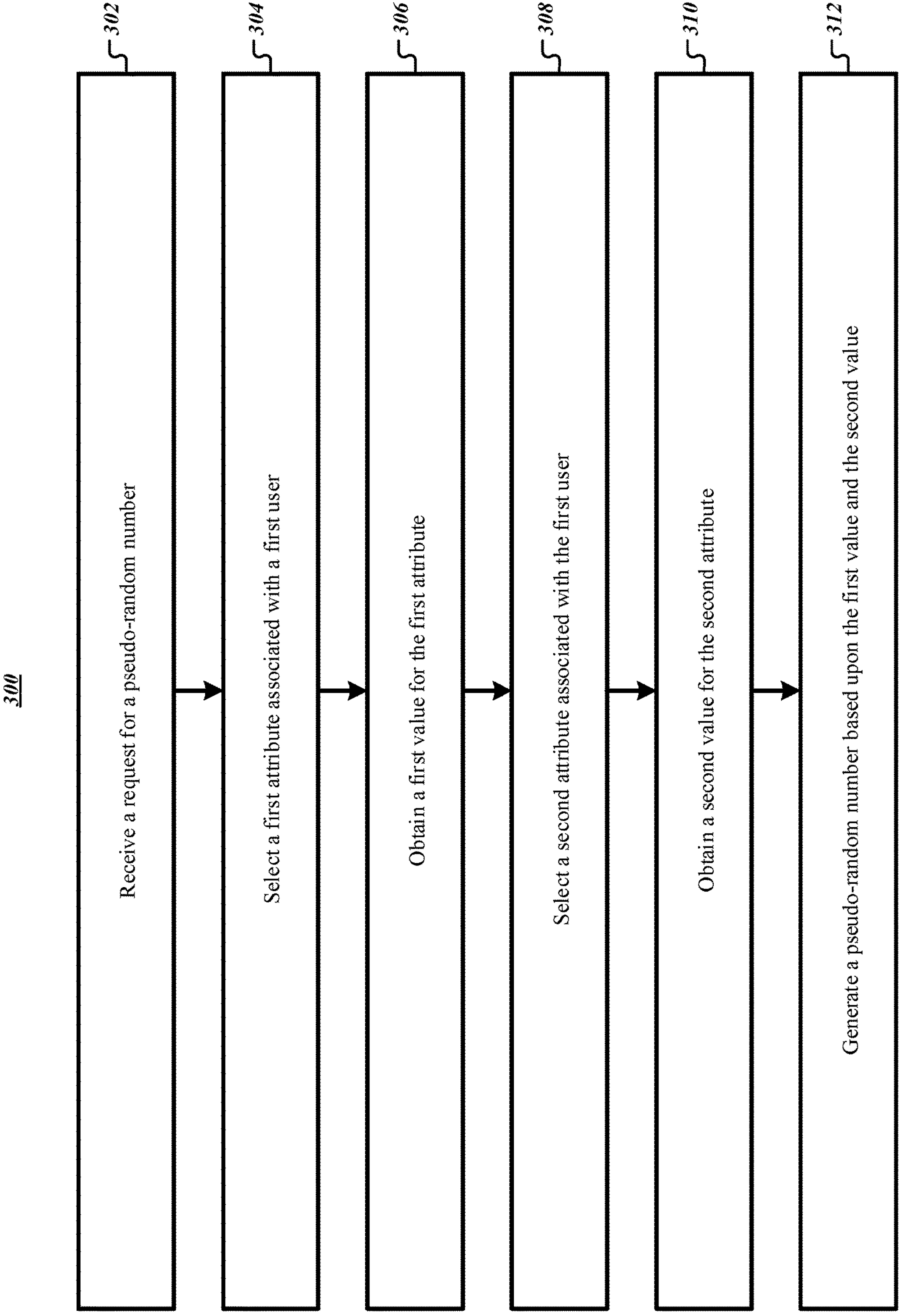
FIG. 3 illustrates an example flowchart for identity based pseudo-random number generation, in accordance with some example embodiments described herein.

FIG. 3 illustrates a flowchart containing a series of operations for identity based pseudo-random number generation. The operations illustrated in FIG. 3 may, for example, be performed by, with the assistance of, and/or under the control of an apparatus (e.g., identity server 200), as described above. In this regard, performance of the operations may invoke one or more of processor 202, memory 204, input/output circuitry 206, communications circuitry 208, and/or generation circuitry 210.

As shown in operation 302, the apparatus (e.g., identity server 200) includes means, such as input/output circuitry 206, communications circuitry 208, or the like, for receiving a request for a pseudo-random number. In some example embodiments, as described above and more fully with reference to FIG. 5 below, the communications circuitry 208 may receive a request for a pseudo-random number or an instruction to generate a pseudo-random number from a first user device 102 and/or external device 106. By way of example, the first user device 102 may request an authorized session with the external device 106, and may request a pseudo-random number from the identity server 200 to authorize the session (e.g., serve as a session identifier, serve as authentication credentials, serve as a password, etc.). Similarly, in some embodiments, the first user device 102 may receive a request for a session from an external device 106, and may request a pseudo-random number from the identity server 200 for use in authorizing the session. In some other embodiments, the input/output circuitry 206 of the identity server 200 may receive a request (e.g., via a direct user input or automatically) for a pseudo-random number without input from the first user device 102 or external device 106, such as in an instance in which the identity server 200 requires a pseudo-random number to complete an internal process. Alternatively, however, the input/output circuitry 206 may receive the request for a pseudo-random number from direct user interaction with the identity server 200.

Thereafter, as shown in operation 304, the apparatus (e.g., identity server 200) includes means, such the processor 202 or the like, for selecting a first attribute associated with a first user. The first attribute may be associated with a first attribute category that is assigned a first prime number. By way of example, the identity server may select a first attribute as user's birthdate and birthdates may be part of a first attribute category assigned a first prime number (e.g., a prime number of three (3)). In some embodiments, the selection of the first attribute may depend upon the entity or device requesting the pseudo-random number. As described hereafter with reference to FIG. 4, in some embodiments, the pseudo-random number generated by the operations of FIG. 3 may be used as authentication credentials for the first user, the first user device 102, and/or the first user with the request for the pseudo-random number. By way of a particular example, the request for a pseudo-random number received at operation 302 may refer to a request for authentication credential generation (e.g., user password generation) for use with a particular entity (e.g., an entity associated with the external device 106). As such, the first attribute for interactions with this particular entity may, in some embodiments, always refer to selection of the first attribute associated with the authentication credentials necessary to access or interact with the particular entity. By way of continued example, for every request for a pseudo-random number associated with the example entity, the first attribute may be associated with the user's birthdate and the prime number associated with birthdates may be three (3). In this way, the selection of the first attribute may operate to consistently identify and authenticate the first user with the particular entity.

In some example embodiments, the selection of the first attribute may include implementing a random or pseudo-random selection protocol that identifies a first particular attribute. For example, in some instances, the request for a pseudo-random number received at operation 302 may be associated with a single use or time-limited session such that each interaction with the entity associated with the request allows or requires generation of a new pseudo-random number. Said differently, in instances in which the pseudo-random number generated by the operations of FIG. 3 is not used or otherwise required for subsequent authentication of the associated first user, the selection of the first attribute at operation 304 may occur randomly or pseudo-randomly. By way of example, in some embodiments, once a first attribute is selected, a selection frequency for each user attribute may be monitored such that the likelihood that an unselected attribute is selected on subsequent selections at operation 304 is increased until the unselected attributed is selected as the first attribute. Although an example frequency calculation procedure is outlined above, the present disclosure contemplates that any known pseudo-random number generation algorithm (e.g., a middle-square method, mersenne twister, inversive congruential generator, lagged Fibonacci generator, linear feedback shift register or the like) may additionally or alternatively be used to pseudo-randomly select the first attribute without departing from the scope of the disclosure.

The first attribute category associated with the first attribute and the assigned prime number may, in some embodiments, be set as part of an initial set up procedure. By way of example, in instances in which the pseudo-random number operates to authenticate the user with a particular entity (e.g., an entity associated with the external device 106), the prime number assigned to the first category may remain unchanged for each interaction between the first user, first user device 102, and/or external device 106. Said differently, in order to provide consistent identification and authentication for the first user and the first user device 102, the prime number assigned to the first category (e.g., birthdate) may remain unchanged (e.g., always a prime number of three (3)). In other embodiments in which the pseudo-random number is used for a single use or time-limited session, the prime number assigned to the category associated with the selected first attribute may be randomly or pseudo-randomly selected as described above to further convolute the pseudo-random number generated by the operations of FIG. 3.

Thereafter, as shown in operation 306, the apparatus (e.g., identity server 200) includes means, such as processor 202, memory 204, input/output circuitry 206, communications circuitry 208, or the like, for obtaining a first value for the first attribute. In some example embodiments, as described in greater detail below in connection with FIG. 4, obtaining the first value includes querying, by the communications circuitry 208, a digital identity construct database 110 storing one or more user attributes associated with the first user. As described above, in some embodiments, the digital identity construct database 110 may be stored remotely while, in other embodiments, the digital identity construct may be stored by the identity server 200, the first user device 102, and/or the external device 106. In other embodiments, obtaining the first value includes requesting, by input/output circuitry of the first user device 102, a user input corresponding to the selected first attribute. For example, the identity server 200 may prompt the user (e.g., via a touchscreen display defined by the first user device 102) to input the user's birthdate. Although described herein with reference to a static user attribute (e.g., a user's birthdate), the present disclosure contemplates that the selected first attribute may include a dynamic user attribute (e.g., height, weight, etc.), and/or may leverage one or more sensors of the first user device 102 to obtain the first attribute (e.g., a fingerprint scanner to capture the user's fingerprint, camera to determine user's hair color, etc.). Because in some embodiments the identity server 200 comprises the first user device 102, this operation may utilize the input/output circuitry 206 of the identity server 200 itself in some cases. All of these operations may, of course, be facilitated by processor 202.

In some embodiments, obtaining the first attribute at operation 306 may include obtaining a first value by the nature of the selected first attribute. For example, in instances in which the selected first attribute is associated with a location (e.g., global positioning system (GPS) coordinates or the like), a date (e.g., birthdate, date of first car purchase, etc.) or numerical biometric feature (e.g., weight, height, etc.) or the like, the value of the first attribute may refer to the numerical value associated with the first attribute. In other embodiments in which the selected first attribute is not associated with a numerical value (e.g., a user's hair color, type of car owned, city of current location, etc.), the identity server 200 may employ one or more hash functions, randomization functions, binarizing operations, or other techniques configured to convert non-numerical elements into associated numerical values. By way of continued example, in an embodiment in which the selected first attribute is the first user's birthdate, the value obtained at operation 306 may refer to the numerical value associated with the user's birthday (e.g., a birthday of Jan. 1, 1980, may be 010180). As described above and detailed hereafter, the selected first attribute (e.g., the first user's birthdate) may be assigned an associated prime number (e.g., a prime number of three (3)) based upon the prime number associated with the first attribute category.

Thereafter, as shown in operation 308, the apparatus (e.g., identity server 200) includes means, such the processor 202 or the like, for selecting a second attribute associated with the first user. The second attribute may be associated with a second attribute category that is assigned a second prime number. By way of example, the identity server may select a second attribute as a user's weight and weight may be part of a second attribute category assigned a second prime number (e.g., a prime number of two (2)). In some embodiments, the selection of the second attribute may depend upon the entity or device requesting the pseudo-random number. As described hereafter with reference to FIG. 4, in some embodiments, the pseudo-random number generated by the operations of FIG. 3 may be used as authentication credentials for the first user, the first user device 102, and/or the first user with the request for the pseudo-random number. As described above, the request for a pseudo-random number received at operation 302 may refer to a request for authentication credential generation (e.g., user password generation) for use with a particular entity (e.g., an entity associated with the external device 106). As such, the second attribute for interactions with this particular entity may, in some embodiments, always refer to selection of the second attribute associated with the authentication credentials necessary to access or interact with the particular entity. By way of continued example, for every request for a pseudo-random number associated with the example entity, the second attribute may be associated with the user's weight and the prime number associated with birthdates may be two (2). In this way, the selection of the second attribute may operate to consistently identify and authenticate the first user with the particular entity.

In some example embodiments, the selection of the second attribute may include implementing a random or pseudo-random selection protocol that identifies a second particular attribute. For example, in some instances, the request for a pseudo-random number received at operation 302 may be associated with a single use or time-limited session such that each interaction with the entity associated with the request allows or requires generation of a new pseudo-random number. Said differently, in instances in which the pseudo-random number generated by the operations of FIG. 3 is not used or otherwise required for subsequent authentication of the associated first user, the selection of the second attribute at operation 308 may occur randomly or pseudo-randomly. By way of example, in some embodiments, once a second attribute is selected, a selection frequency for each user attribute may be monitored such that the likelihood that an unselected attribute is selected on subsequent selections at operation 308 is increased until the unselected attributed is selected as the second attribute. Such a selection may also account for the attribute selected as the first attribute at operation 304. Although an example frequency calculation procedure is described herein, the present disclosure contemplates that any known pseudo-random number generation algorithm (e.g., a middle-square method, mersenne twister, inversive congruential generator, lagged Fibonacci generator, linear feedback shift register or the like) may additionally or alternatively be used to pseudo-randomly select the second attribute without departing from the scope of the disclosure.

The second attribute category associated with the second attribute and the assigned prime number may, in some embodiments, be set as part of an initial set up procedure. By way of example, in instances in which the pseudo-random number operates to authenticate the user with a particular entity (e.g., an entity associated with the external device 106), the prime number assigned to the second category may remain unchanged for each interaction between the first user, first user device 102, and/or external device 106. Said differently, in order to provide consistent identification and authentication for the first user and the first user device 102, the prime number assigned to the second category (e.g., weight) may also remain unchanged (e.g., always a prime number of two (2)). In other embodiments in which the pseudo-random number is used for a single use or time-limited session, the prime number assigned to the category associated with the selected second attribute may be randomly or pseudo-randomly selected as described above to further convolute the pseudo-random number generated by the operations of FIG. 3.

Thereafter, as shown in operation 310, the apparatus (e.g., identity server 200) includes means, such as processor 202, memory 204, input/output circuitry 206, communications circuitry 208, or the like, for obtaining a second value for the second attribute. In some example embodiments, as described in greater detail below in connection with FIG. 4, obtaining the second value includes querying, by the communications circuitry 208, a digital identity construct database 110 storing one or more user attributes associated with the first user. As described above, in some embodiments, the digital identity construct database 110 may be stored remotely while, in other embodiments, the digital identity construct may be stored by the identity server 200, the first user device 102, and/or the external device 106. In other embodiments, obtaining the second value includes requesting, by input/output circuitry of the first user device 102, a user input corresponding to the selected second attribute. For example, the identity server 200 may prompt the user (e.g., via a touchscreen display defined by the first user device 102) to input the user's weight. Although described herein with reference to a dynamic user attribute (e.g., a user's weight), the present disclosure contemplates that the selected second attribute may include a static user attribute, and/or may leverage one or more sensors of the first user device to obtain the second attribute (e.g., a scale or the like).

As described above, obtaining the second attribute at operation 310 may include obtaining a second value by the nature of the selected second attribute. For example, in instances in which the selected second attribute is associated with a location (e.g., global positioning system (GPS) coordinates or the like), a date (e.g., birthdate, date of first car purchase, etc.), numeric biometric feature (e.g., weight, height, etc.), or the like, the value of the second attribute may refer to the numerical value associated with the second attribute. In other embodiments in which the selected second attribute is not associated with a numerical value (e.g., a user's hair color, type of car owned, city of current location, etc.), the identity server 200 may employ one or more hash functions, randomization function, binarizing operations, or the like configured to convert non-numerical elements into associated numerical values. By way of continued example, in an embodiment in which the selected second attribute is the first user's weight, the value obtained at operation 310 may refer to the numerical value associated with the user's weight (e.g., a weight of 90 kg is 90). As described above and detailed hereafter, the selected second attribute (e.g., the first user's weight) may be assigned an associated prime number (e.g., a prime number of two (2)) based upon the prime number associated with the second attribute category.

Thereafter, as shown in operation 312, the apparatus (e.g., identity server 200) includes means, such as generation circuitry 210, processor 202, or the like, for generating a pseudo-random number based upon the first value and the second value. As described above with reference to operations 306 and 310 above, the first value for the first attribute and the second value for the second attribute may comprise two numerical values each of which is assigned a prime number associated with the respective attribute category. To generate the pseudo-random number based upon the first value with the second value, the identity server 200 may perform any mathematical transformation based on the numerical values and associated prime numbers. For example, the mathematical operation, in some embodiments, comprise a multiplication of the first value raised to the assigned prime number and the second value raised to the assigned prime number to generate the pseudo random number (e.g., $010180^3 \times 90^2$). The present disclosure contemplates that any number of mathematical operations and combinations of mathematical operations (e.g., multiplication, addition, subtraction, division, exponential functions, logarithmic functions, etc.) may be used to generate the pseudo-random number at operation 312 such that the generated pseudo-random number is of near-infinite scope and degree. Furthermore, the present disclosure contemplates that the numerical values obtained from the first attribute and the second attribute may, based upon the size of these numerical values, operate to increase the assurance associated with the generated pseudo-random number. For example, increasing the number of selected attributes and/or the values of these attributes (e.g., GPS coordinates or the like) operates to substantially increase the complexity of the generated pseudo-random number. Still further, the present disclosure contemplates that the prime number assigned to the associated attribute category (e.g., 2, 3, 5, 7, 11, 13, 17, 19, . . . ) may be used to also increase the complexity of the generated pseudo-random number.

Figure 4:
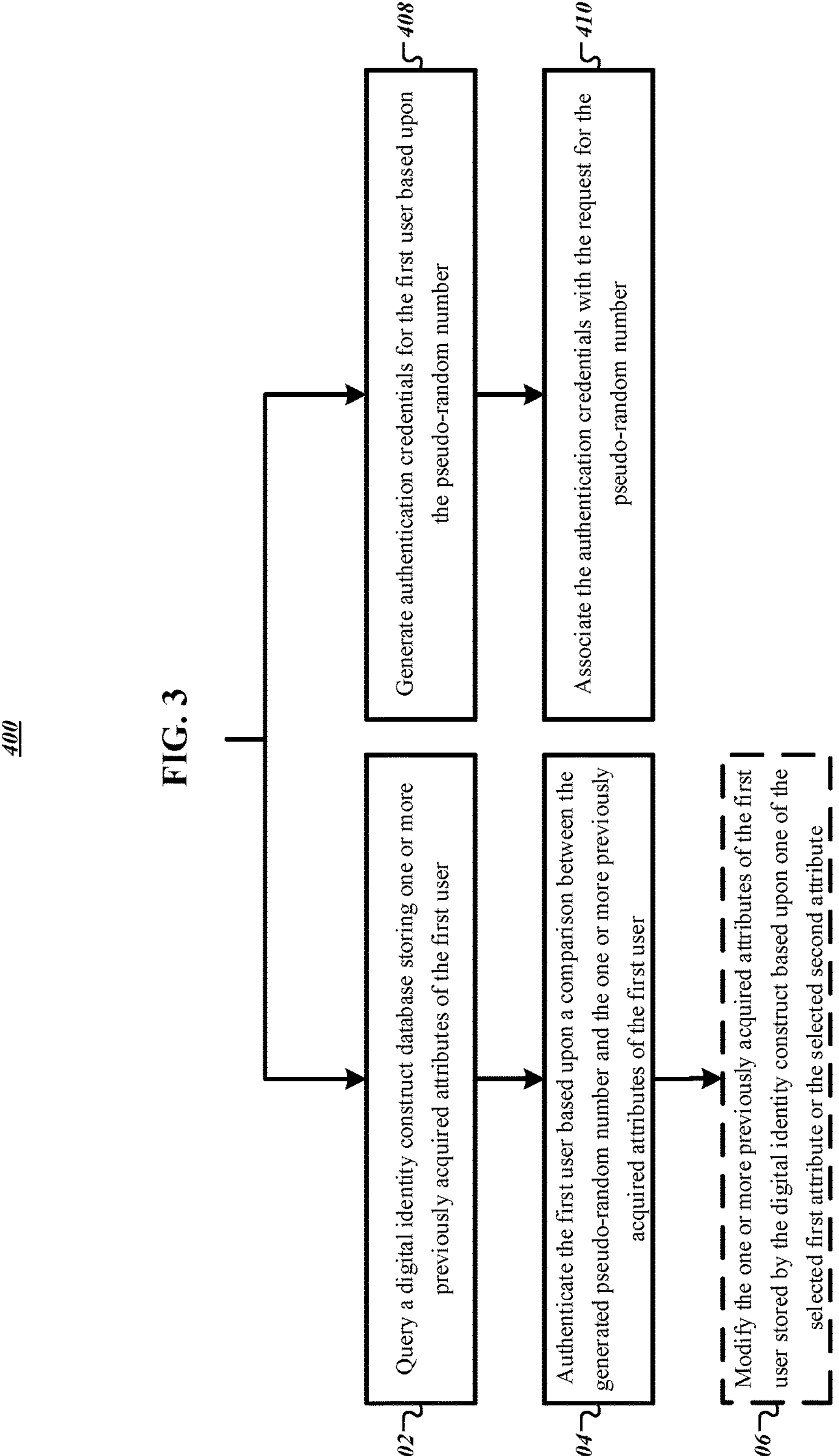
FIG. 4 illustrates an example flowchart for authentication operations based upon a generated pseudo-random number, in accordance with some example embodiments described herein.

Turning next to FIG. 4, a flowchart is shown that describes example authentication operations based on the pseudo-random number of FIG. 3. The operations illustrated in FIG. 4 may, for example, be performed by, with the assistance of, and/or under the control of an apparatus (e.g., identity server 200), as described above. In this regard, performance of the operations may invoke one or more of processor 202, memory 204, input/output circuitry 206, communications circuitry 208, and/or generation circuitry 210.

In operation 402, the apparatus (e.g., identity server 200) may further include means, such as the input/output circuitry 206, communications circuitry 208, or the like for querying a digital identity construct database storing one or more previously acquired attributes of the first user. In some embodiments, as described herein with reference to operations 402-406, the identity server 200 may operate to authenticate a user, in real-time or substantially real time. In particular, the generation of the pseudo-random number of FIG. 3 may, by being based upon attributes associated with the first user, be used to authenticate a user, such as in an interaction between the first user device 102 and the external device 106. As such, the identity server 200 may query a digital identity construct database 110 that includes one or more previously acquired attributes of the first user in order to generate a pseudo-random number based upon the corresponding one or more previously acquired attributes. Said differently, the query at operation 402 may retrieve the selected first attribute and assigned first prime number and the selected second attribute and assigned second prime number. In doing so, the identity server 200 may generate a pseudo-random number based upon these attributes and compare this pseudo-random number with the pseudo random number generated at, for example, operation 310.

In operation 404, the apparatus (e.g., identity server 200) may further include means, such as the processor 202, generation circuitry 210, or the like for authenticating the first user based upon a comparison between the generated pseudo-random number and the one or more previously acquired attributes of the first user. By way of continued example, the digital identity construct database 110 may store one or more first user attributes including the user's birthdate (e.g., first attribute) and the user's weight (e.g., second attribute). In operation, the identity server 200 may access the assigned prime number from the digital identity construct database 110 or may otherwise know of the assigned prime number based upon one or more prior iterations of the operations of FIGS. 3-4 (e.g., prior requests for pseudo-random number generation). As such, the identity server 200 may generate a pseudo-random number based upon these retrieved attributes from the digital identity construct database and authenticate the first user and first user device 102 in an instance in which the pseudo-random number match or are substantially similar (e.g., instances in which, for example, the user's weight has changed). The present disclosure contemplates that, given that the attributes of the user may be dynamic, the identity server 200 may employ one or more neural networks, machine learning techniques, feedback loops, etc. in order to predict or otherwise determine variance associated with, for example, a dynamic user attribute.

In some embodiments, as shown in operation 406, the apparatus (e.g., identity server 200) may include means, such as the processor 202, generation circuitry 210, or the like for modifying the one or more previously acquired attributes of the first user stored by the digital identity construct database 110 based upon one of the selected first attribute or the selected second attribute. By way of continued example, in some embodiments, the selected user attribute may be dynamic in nature such that the corresponding attribute stored by the digital identity construct database is not identical to the current numerical value for the selected attribute. As above, the identity server 200 may operate to project, estimate, or otherwise determine this discrepancy as part of the comparison at operation 404. In response, the identity server 200 may operate to modify, update, or otherwise adjust the digital identity construct database to account for any variance associated with a selected user attribute. In doing so, the identity server 200 may operate to iteratively improve the digital identity construct database while also ensuring accurate and consistent authentication for the first user with subsequent requests for pseudo-random number generation.

In other embodiments, as shown in operation 408, the apparatus (e.g., identity server 200) includes means, such as processor 202, or the like, for generating authentication credentials for the first user based upon the pseudo-random number. By way of example, in some instances, the pseudo-random number generated at operation 310 may be associated with a password generation scheme or equivalent authentication credentials generation scheme or mechanism. Said differently, the operations of FIG. 3 may, in order to reduce the burden on an associated user, operate to generate passwords for a user's interaction with an entity. Given that the pseudo-random number generated at operation 310 is based upon attributes associated with the user (e.g., received from the user in real time, received from a digital identity construct database, or the like), the user may leverage the identity server 200 to generate passwords for the user without requiring the user to maintain or update these passwords.

Thereafter, as shown in operation 410, the apparatus (e.g., identity server 200) includes means, such as processor 202, or the like, for associating the authentication credentials with the request for the pseudo-random number. By way of continued example, in instances in which the pseudo-random number is associated with a password or authentication credential generation scheme or mechanism, the identity server 200 may operate to associate the pseudo-random number with the request as an authentication credential associated with the first user and first user device 102. Said differently, a first user and first user device 102 may, as part of an initial interaction with an external device 106 or otherwise, request a pseudo-random number from the identity server 200. The operations of FIG. 3 and operations 408-410 may generate a pseudo-random number based upon user attributes as described above, and authentication credentials based upon this pseudo-random number may be generated in response to the request.

Figure 5:
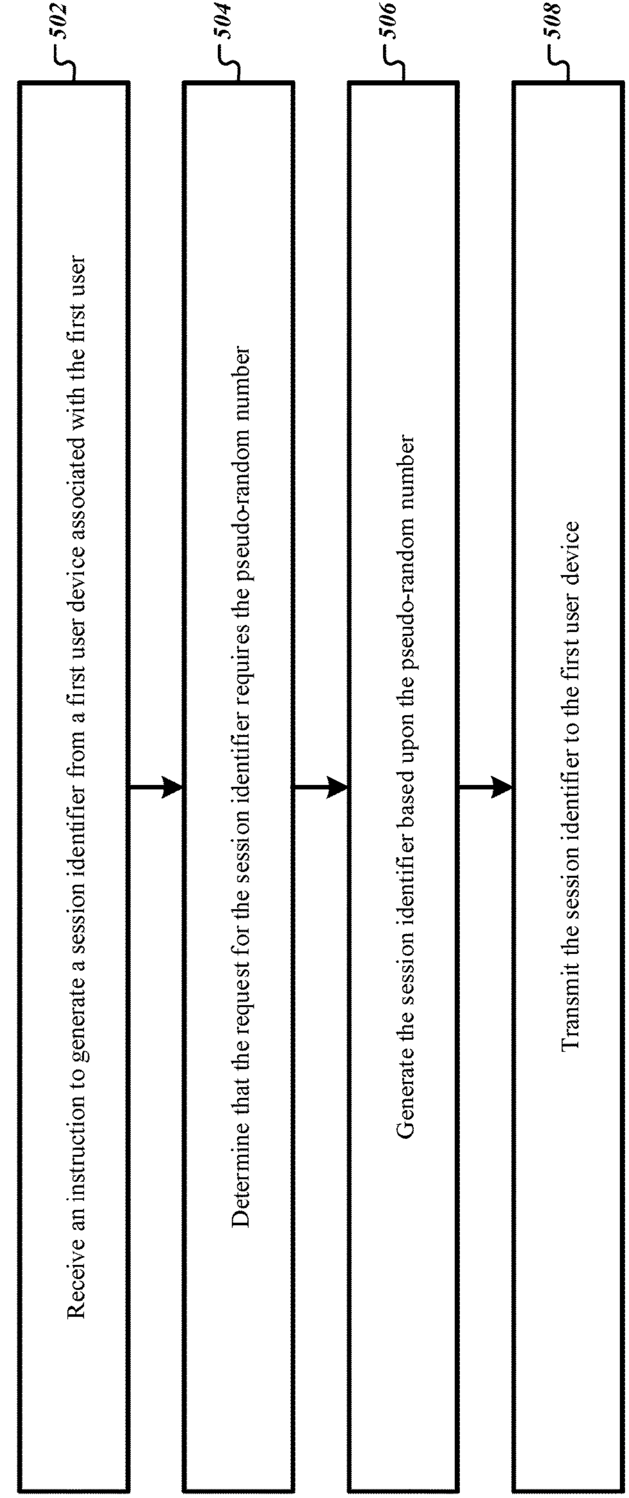
FIG. 5 illustrates an example flowchart for session authentication based on a generated pseudo-random number, in accordance with some example embodiments described herein.

Turning next to FIG. 5, a flowchart is shown that describes generation of a session identifier based on the pseudo-random number of FIG. 3. The operations illustrated in FIG. 5 may, for example, be performed by, with the assistance of, and/or under the control of an apparatus (e.g., identity server 200), as described above. In this regard, performance of the operations may invoke one or more of processor 202, memory 204, input/output circuitry 206, communications circuitry 208, and/or generation circuitry 210.

In operation 502, the apparatus (e.g., identity server 200) may further include means, such as the input/output circuitry 206, communications circuitry 208, or the like for receiving an instruction to generate a session identifier from a first user device 102 associated with a first user. As described above, in some embodiments, the first user device 102 may transmit an instruction to the identity server 200 to generate a pseudo-random number. By way of example, a first user device 102 may be communicably connected to an external device 106 (e.g., an online vendor or banking entity) and may, due to the circumstances surrounding the connection (e.g., purchasing an item, performing a wire transfer, or the like), may request an authenticated session requiring a pseudo-random number. This request may be transmitted by the first user device 102 as a results of a user input, but, in many cases, the first user device 102 may automatically transmit a request for a pseudo-random number (e.g., an initial connection to the online vendor's website, logging into an online bank account, etc.).

Thereafter, as shown in operation 504, the apparatus (e.g., identity server 200) includes means, such as processor 202, memory 204, communications circuitry 208, or the like, for determining that the request for the session identifier requires the pseudo-random number. This determination may be performed by the identity server 200, and associated circuitry components, based upon the instructions from the first user device at operation 502. For example, the request from the first user device 102 may indicate that a pseudo-random number is necessary to serve as a session identifier to authenticate a session.

With reference to operation 506, the apparatus (e.g., identity server 200) includes means, such as processor 202, memory 204, communications circuitry 208, or the like, for generating a session identifier based upon the pseudo-random number (e.g., generated by the operations of FIG. 3). In some embodiments, the session identifier comprises the generated pseudo-random number. In such an embodiment, the resultant pseudo-random number (e.g., as generated by the operations of FIG. 3) may by transmitted by the identity server 200 to one or more of the first user device 102 or the external device 106. In other embodiments, the pseudo-random number generated by the operations of FIG. 3 may be used as a data seed based for use in further pseudo-random number operations. For example, the generated pseudo-random number may be used to seed a linear congruential generator (e.g., or other equivalent pseudo-random number generation algorithms) to further complicate the process required for a perpetrator to determine the session identifier. Although described in reference to a liner congruential generator, the present disclosure contemplates that any other pseudo-random number generation algorithm (e.g., a middle-square method, mersenne twister, inversive congruential generator, lagged Fibonacci generator, linear feedback shift register or the like) may be used without departing from the scope of the disclosure.

Thereafter, as shown in operation 508, the apparatus (e.g., identity server 200) includes means, such as communications circuitry 208 or the like, for transmitting the session identifier to the first user device 102. As described above with reference to authenticating a session, the communications circuitry 208 may transmit the session identifier (based upon the pseudo-random number) to the first user device 102 to authenticate a session.

As described above, various technical challenges are surmounted via technical solutions contemplated herein. For example, embodiments of the disclosure may select (e.g., randomly or otherwise) user attributes that are associated with attribute categories that are also assigned a prime number. Various operations described herein may be used to obtain a value for the respective attribute and, in combination with the assigned prime number, may generate a pseudo-random number based upon the obtained values. Such a generated pseudo-random number may, in some embodiments, be used to generate authentication credentials (e.g., a password or the like) for the associated user and/or serve as the basis for a session identifier. Furthermore, embodiments described herein may leverage a digital identity construct database that operates as an evolving collection of user attributes so as to provide dynamic credential and session identifier generation. In this way, the inventors have identified that the advent of computing resources have created a new opportunity for solutions to pseudo-random number generation and authentication which were historically unavailable.

FIGS. 3-5 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the identity server 200 and executed by a processor 202 of the identity server 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

CONCLUSION

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A computer-implemented method for identity-based pseudo-random number generation, the computer-implemented method comprising:

receiving a request to generate a pseudo-random number to be used as a first type of identifier;

selecting, a first attribute from a plurality of attributes associated with a first user, wherein the first attribute is associated with a first attribute category, wherein the first attribute category is assigned a first prime number;

selecting a second attribute from the plurality of attributes associated with the first user, wherein the second attribute is associated with a second attribute category, wherein the second attribute category is assigned a second prime number; and in response to the request being to generate the pseudo-random number to be used as the first type of identifier, performing a first set of operations to generate the pseudo-random number, wherein the first set of operations is different from a second set of operations that would be performed in response to another request to generate a different pseudo-random number to be used as a second type of identifier, wherein the second set of operations comprises:

obtaining, based on the first prime number and a first numerical value representing the first attribute, a first value, obtaining, based on the second prime number and a second numerical value representing the second attribute, a second value, and generating the different pseudo-random number based on the first value and the second value; and wherein the first set of operations comprises:

randomly or pseudo-randomly selecting a third prime number that is different from the first prime number assigned to the first attribute category, obtaining, based on the third prime number and the first numerical value representing the first attribute, a third value, obtaining, based on the second prime number and the second numerical value representing the second attribute, the second value, and generating the pseudo-random number based on the second value and the third value.

2. The computer-implemented method according to claim 1, further comprising:

generating authentication credentials for the first user based upon the pseudo-random number; and associating the authentication credentials with the request for the pseudo-random number.

3. The computer-implemented method according to claim 1, further comprising:

querying a digital identity construct database storing one or more previously acquired attributes of the first user; and authenticating the first user based upon a comparison between the generated pseudo-random number and the one or more previously acquired attributes of the first user.

4. The computer-implemented method according to claim 3, further comprising modifying the one or more previously acquired attributes of the first user stored by the digital identity construct database based upon one of the selected first attribute or the selected second attribute.

5. The computer-implemented method according to claim 1, further comprising:

receiving an instruction to generate a session identifier from a first user device associated with the first user;

determining that the request for the session identifier requires the pseudo-random number;

generating the session identifier based upon the pseudo-random number; and transmitting the session identifier to the first user device.

6. The computer-implemented method according to claim 1, wherein selecting one of the first attribute or the second attribute comprises querying a digital identity construct database storing one or more previously acquired attributes of the first user.

7. The computer-implemented method according to claim 6, wherein selection of one of the first attribute or the second attribute comprises implementing a pseudo-random selection protocol that identifies a first particular attribute or a second particular attribute, respectively, from the digital identity construct database.

8. The computer-implemented method according to claim 1, wherein selecting one of the first attribute or the second attribute comprises receiving a user input by the first user corresponding to either the first attribute or the second attribute, respectively.

9. The computer-implemented method according to claim 1, further comprising:

in an instance in which the first attribute is non-numerical, converting the first attribute into the first numerical value to obtain the first value for the first attribute; and in an instance in which the second attribute is non-numerical, converting the second attribute into the second numerical value to obtain the second value for the second attribute.

10. An apparatus for identity-based pseudo-random number generation comprising at least one processor and at least one memory, the at least one memory having computer-code instructed stored thereon that, in execution with the at least one processor, configure the apparatus to:

receive a request to generate a pseudo-random number to be used as a first type of identifier;

select a first attribute from a plurality of attributes associated with a first user, wherein the first attribute is associated with a first attribute category, wherein the first attribute category is assigned a first prime number;

select a second attribute from the plurality of attributes associated with the first user, wherein the second attribute is associated with a second attribute category, wherein the second attribute category is assigned a second prime number; and in response to the request being to generate the pseudo-random number to be used as the first type of identifier, perform a first set of operations to generate the pseudo-random number, wherein the first set of operations is different from a second set of operations that would be performed in response to another request to generate a different pseudo-random number to be used as a second type of identifier, wherein the second set of operations comprises:

obtaining, based on the first prime number and a first numerical value representing the first attribute, a first value, obtaining, based on the second prime number and a second numerical value representing the second attribute, a second value, and generating the different pseudo-random number based on the first value and the second value; and wherein the first set of operations comprises:

randomly or pseudo-randomly selecting a third prime number that is different from the first prime number assigned to the first attribute category, obtaining, based on the third prime number and the first numerical value representing the first attribute, a third value;

obtaining, based on the second prime number and the second numerical value representing the second attribute, the second value; and generating the pseudo-random number based on the second value and the third value.

11. The apparatus according to claim 10, further configured to:

generate authentication credentials for the first user based upon the pseudo-random number; and associate the authentication credentials with the request for the pseudo-random number.

12. The apparatus according to claim 10, further configured to:

query a digital identity construct database storing one or more previously acquired attributes of the first user; and authenticate the first user based upon a comparison between the generated pseudo-random number and the one or more previously acquired attributes of the first user.

13. The apparatus according to claim 12, further configured to modify the one or more previously acquired attributes of the first user stored by the digital identity construct database based upon one of the selected first attribute or the selected second attribute.

14. The apparatus according to claim 10, further configured to:

receive an instruction to generate a session identifier from a first user device associated with the first user;

determine that the request for the session identifier requires the pseudo-random number;

generate the session identifier based upon the pseudo-random number; and transmit the session identifier to the first user device.

15. The apparatus according to claim 10, wherein in selecting one of the first attribute or the second attribute, the apparatus is further configured to query a digital identity construct database storing one or more previously acquired attributes of the first user.

16. The apparatus according to claim 15, wherein in selecting one of the first attribute or the second attribute, the apparatus is configured to implement a pseudo-random selection protocol that identifies a first particular attribute or a second particular attribute, respectively, from the digital identity construct database.

17. A computer program product for identity based pseudo-random number generation comprising at least one non-transitory computer-readable storage medium having computer program code thereon that, in execution with at least one processor, configures the computer program product for:

receiving a request to generate a pseudo-random number to be used as a first type of identifier;

selecting a first attribute from a plurality of attributes associated with a first user, wherein the first attribute is associated with a first attribute category, wherein the first attribute category is assigned a first prime number;

selecting a second attribute from the plurality of attributes associated with the first user, wherein the second attribute is associated with a second attribute category, wherein the second attribute category is assigned a second prime number; and in response to the request being to generate the pseudo-random number to be used as the first type of identifier, performing a first set of operations to generate the pseudo-random number, wherein the first set of operations is different from a second set of operations that would be performed in response to another request to generate a different pseudo-random number to be used as a second type of identifier, wherein the second set of operations comprises:

obtaining, based on the first prime number and a first numerical value representing the first attribute, a first value, obtaining, based on the second prime number and a second numerical value representing the second attribute, a second value, and generating the different pseudo-random number based on the first value and the second value; and wherein the first set of operations comprises:

randomly or pseudo-randomly selecting a third prime number that is different from the first prime number assigned to the first attribute category, obtaining, based on the third prime number and the first numerical value representing the first attribute, a third value;

obtaining, based on the second prime number and the second numerical value representing the second attribute, the second value, and generating the pseudo-random number based on the second value and the third value.

18. The computer program product according to claim 17, the computer program product further configured for:

generating authentication credentials for the first user based upon the pseudo-random number; and associating the authentication credentials with the request for the pseudo-random number.

19. The computer program product according to claim 17, the computer program product further configured for:
querying a digital identity construct database storing one or more previously acquired attributes of the first user; and
authenticating the first user based upon a comparison between the generated pseudo-random number and the one or more previously acquired attributes of the first user.

20. The computer program product according to claim 17, the computer program product further configured for:
receiving an instruction to generate a session identifier from a first user device associated with the first user;
determining that the request for the session identifier requires the pseudo-random number;
generating the session identifier based upon the pseudo-random number; and
transmitting the session identifier to the first user device.

* * * * *